Figure 1:
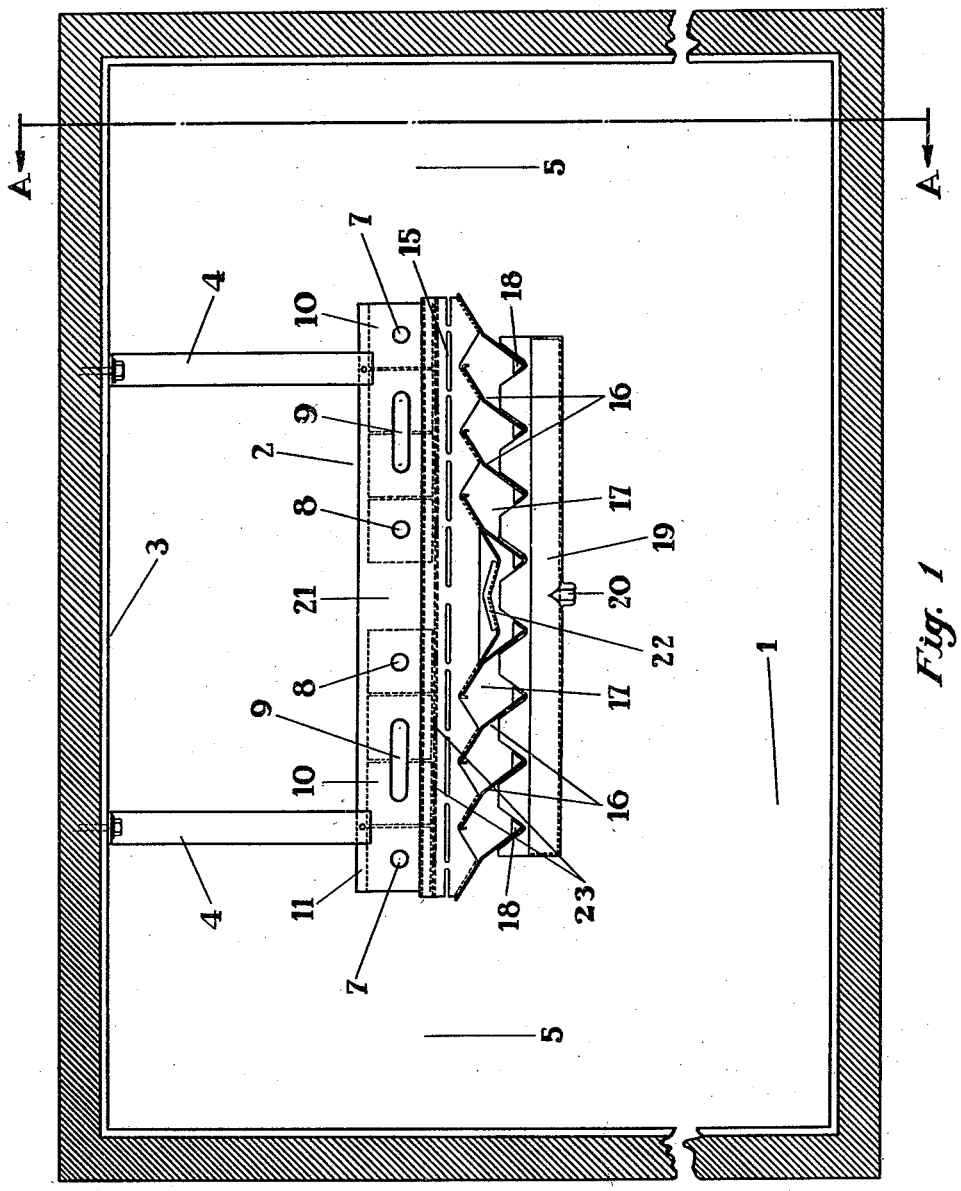

June 23, 1936.  R. W. KRITZER  2,045,528
COOLING UNITS AND COMBINATION AIR CIRCULATOR AND DRIP PAN FOR THE SAME
Filed March 16, 1934  2 Sheets-Sheet 1

Inventor:
Richard W. Kritzer

Patented June 23, 1936

2,045,528

UNITED STATES PATENT OFFICE 2,045,528

COOLING UNITS AND COMBINATION AIR CIRCULATOR AND DRIP PAN FOR THE SAME

Richard W. Kritzer, Chicago, Ill.

Application March 16, 1934, Serial No. 715,800

2 Claims. (Cl. 62—103)

The present invention relates to an improved form of cooling unit and drip pan for the same, also the positioning of the cooling unit in the compartment cooled by the same and relates to my applications Serial Number 711,485 filed February 16, 1934, and Serial Number 712,448 filed February 23, 1934, also the joint application of myself and Anthony F. Hoesel, Serial Number 17,598 filed April 15, 1935.

While the use of fin coils in the refrigerating art is old, their use with multiple channel drip pans of the type shown has never, prior to my invention, been commercially successful.

Fin coils and most other types of cooling units were, generally, mounted with L shaped baffles, the bottom section of which also served as the drip pan to catch the drip during the defrosting of the cooling unit. These baffles extended from one wall to another and allowed a warm air passageway to the cooling unit only between one of the walls and the baffle. In large compartments, it was customary to use two cooling units with their associated baffles, thereby affording a double passageway for the warm air, each passageway being at opposite walls. The center space between the bottom sections of the baffles provided a passageway for the cooled air issuing from the cooling units.

The disadvantages of the old style L shaped baffles were: Lack of uniform air circulation, restriction of air circulation, dehumidification of certain products stored in the compartment, and in some instances the sliming of meats due to lack of uniform circulation. There have been instances where, in the same compartment, meats stored at a certain place would become black upon their surfaces due to excessive dehydration, while at other places meats would become slimy upon their surfaces due to insufficient air circulation.

The general opinion is, that, especially with meats, there is a certain temperature which is best for their preservation. This is true only in a limited sense, since the moisture content of the air surrounding the meat also has a great influence upon its maximum preservation time. A third factor in the preservation of meats is that of air circulation. If the air circulation is insufficient, the meat tends to become enveloped in a blanket of air having a high moisture content, which allows the meat to become slimy. If the air circulation is too rapid, the surfaces of the meat become black due to excessive surface dehydration.

In the proper preservation of meats, at above freezing temperatures, the three factors of temperature, humidity, and air circulation have, each, a great influence upon the maximum preservation time.

One of the objects of my invention is to improve the air circulation in the cooled compartment.

Another object is to minimize the heat exchange through the drip pan support between the cooling unit and the drip pan.

Another object is to maintain the common drain at an increased temperature to prevent its becoming plugged with ice.

Other objects are disclosed in the specifications and claims.

In the drawings, Figure 1 is an end elevational view of a compartment containing the invention.

Figure 2:
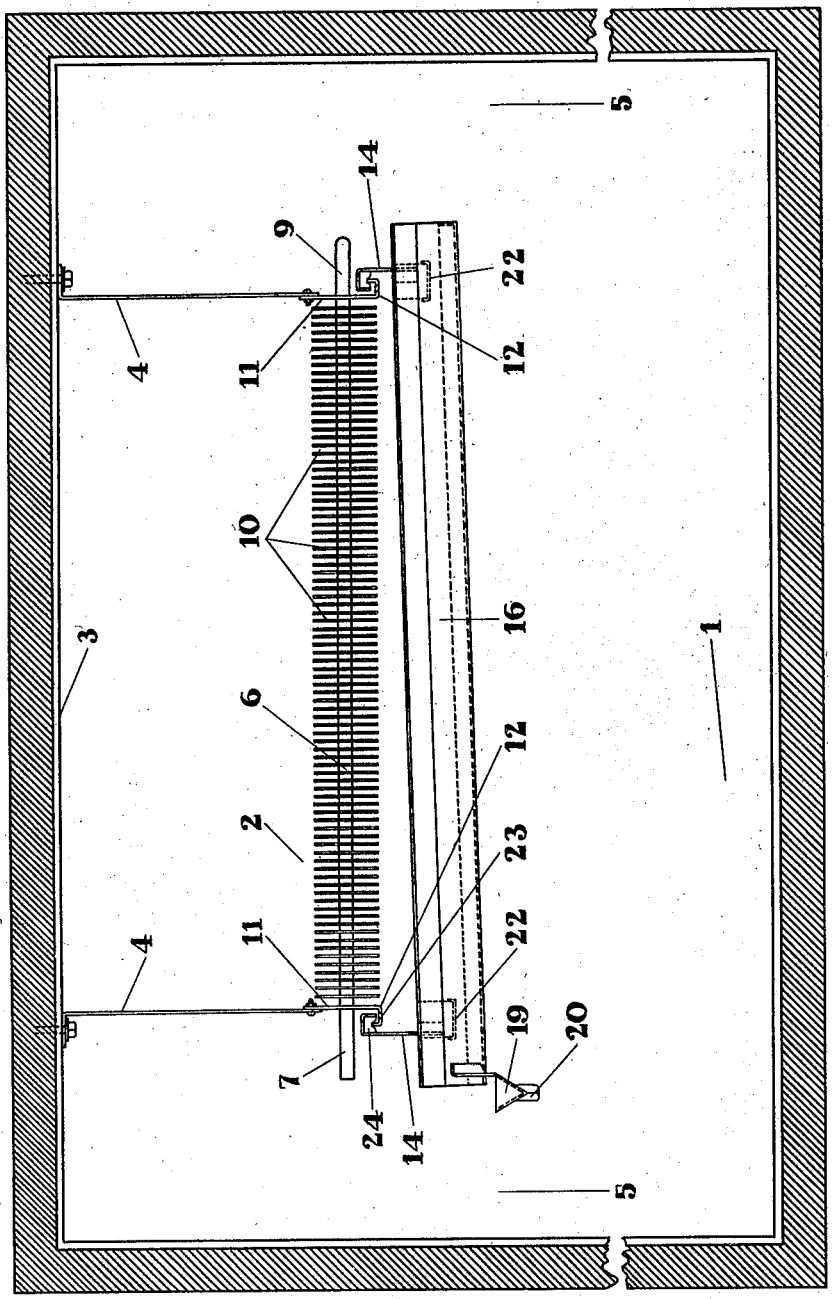

Figure 2 is a side elevational view of Figure 1.

Referring to Figures 1 and 2, the cooled compartment 1 contains a cooling unit 2 mounted upon the ceiling 3 by hangers 4 bolted to the ceiling 3. The cooling unit is so positioned with respect to the side walls, that a warm air passageway 5 exists on all sides.

The cooling unit 2 comprises two refrigerant conduit circuits 6 having inlets 7 and outlets 8 joined by return bends 9. The circuits have a multiplicity of fin plates 10 mounted thereon in order to increase the effective heat transfer surface.

The two refrigerant conduit circuits 6 are tied into a unitary structure by means of end plates 11 engaging the conduits. The lower portions of end plates 11 have a return bend portion 12 with drain holes 23 and the upper lip engaging an insulation spacer 24 upon which rest the drip pan supports 14 having slots 15 intermediate their width.

The louvred channels 16 supported by the drip pan support 14 provide air passageways 17 and drip passageways 18, which spill into a collector trough 19 having a drain 20.

Between the two sections of cooling unit 2 is a space 21 bridged at each end by the end plates 11 and drip pan supports 14 directly under which auxiliary drip deflectors 22 are placed. The space between the two center louvred channels 16 is less than the space 21.

Having described the component parts, I shall now describe the operation of the invention.

Assuming a refrigerant circulated through the conduit circuits 6, the air, in contact with the conduit 6 and the fin plates 10, becomes cooled and passes through the air passageways 17. The cooled air is at a greater temperature than that of the conduits 6 and end plates 11; therefore the louvred channels 16, which are swept on both sides by the cooled air, have a temperature practically equal to the cooled air, providing means are employed to limit the rate of heat transfer from the louvred channels 16 to the end plates 11 and through the drip pan supports 14. This heat transfer limiting means may be of various forms such as the insulating material 24, or the slots 15 in the end plates 11. While either one of these methods will prove effective for the purpose, I show both used. The slots 15 reduce the cross sectional area of the heat transfer, through the end plates 11, to the point where the louvred channels 16, near the drip pan supports 14, have practically the same temperature as the air passing through the passageways 17 at the drip pan supports 14, thereby preventing the condensation of moisture, from the air, upon the under side of the louvred channels 16.

The cooled air issuing from the cooling unit 2 sets up a counter-flow of warm air, which passes upwardly in the passageways 5 and horizontally in the space between the ceiling 3 and the top of the cooling unit 2 and toward the center of the cooling unit. This horizontal movement of the air imparts inertia of movement, which, superposed upon the natural vertical downward movement of the cooled air, results in the air passing through the cooling unit and passageways 17 substantially at the angle of the louvred channels 16.

The angular movement of the cooled air, through the cooling unit 2 and the passageways 17, bathes all of the louvred channels 16, except the extreme right hand and left hand channels 16, Figure 1, on both sides with the cooled air descending from the cooling unit 2. Obviously the bottom side of the extreme right hand and left hand channels 16, Figure 1, is swept by the comparatively warm air ascending the adjacent passages 5. If the upper sides of these extreme channels were contacted by the cooled air, which would then cool them, the ascending warm air stream would deposit moisture upon the bottom surface from which it would drip in an objectionable manner. Reference to Figure 1 shows that the cooling unit 2 and the channels 16 have an appreciable separation. Experiments have definitely proven that these extreme right hand and left hand channels 16 are at a definitely increased temperature, over that of the other channels 16, because the upper sides of these channels are bathed by an induction circulation of warm air, which is carried along by the movement of the cooled air adjacent the bottom side of the second channels 16 at the right hand and left hand sides, Figure 1.

As will be noted by reference to Figures 1 and 2, the cooling unit 2 is so positioned in the compartment 1, that a warm air passageway 5 exists at all sides of the cooling unit 2. Since, in most cases, the major heat load is that due to heat inleakage through the walls of the compartment, the provision of the passageway 5 at all sides of the cooling unit 2 results in a more uniform circulation of the air and eliminates the variable circulation obtaining in the old type baffle arrangement.

Assuming the stoppage of refrigerant circulation through the conduit circuits 6 and the cooling unit 2 being on its defrosting cycle, it is obvious that the heat necessary to defrost must be obtained by an air circulation, which will always exist as long as the temperature of the cooling unit is below that of the air in the passageway 5. Whenever the cooling unit attains a temperature of 32 degrees Fahrenheit, it starts a dripping of the moisture frozen upon its surfaces during the on cycle of the refrigerant circulation. The drip drops into the louvred channels 16, which are pitched toward and spill into a collector trough 19 provided with a drain outlet 20, which, generally, is connected to a sewer.

It will be noted that the collector trough 19 and the drain outlet 20 are placed outside the zone of direct influence of the cooled air passing through the cooling unit 2, thereby obviating the possibility of the outlet 20 becoming plugged with ice.

The auxiliary drip deflectors 22 serve to deflect any drip from the center of the end plates 11 and drip pan supports 14 into the two center louvred channels 16, which by the use of these auxiliary deflectors 22 instead of a drip deflector extending the entire length of the cooling unit 2, have a greater effective cooled air outlet area.

While the above is a preferred embodiment of the invention, it may be widely varied without departing from the spirit and scope of the invention.

What I claim is:

1. In a combined finned cooling unit and drip pan for the same, the combination of, an end fin having a flanged portion at its lower edge, a support for the drip pan, and having a flanged portion at its upper edge, the support flange engaging the fin flange to provide a suspension for the drip pan, and openings in the support.

2. In a combined finned cooling unit and drip pan for the same, the combination of, an end fin having a flanged portion at its lower edge, a support for the drip pan, and having a flanged portion at its upper edge, the support flange engaging the fin flange to provide a suspension for the drip pan, and openings in the support, and the cross sectional area of the support being reduced intermediate the flange and the drip pan.

RICHARD W. KRITZER.